Figure 8:
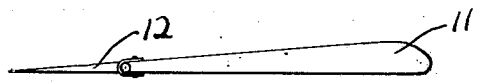

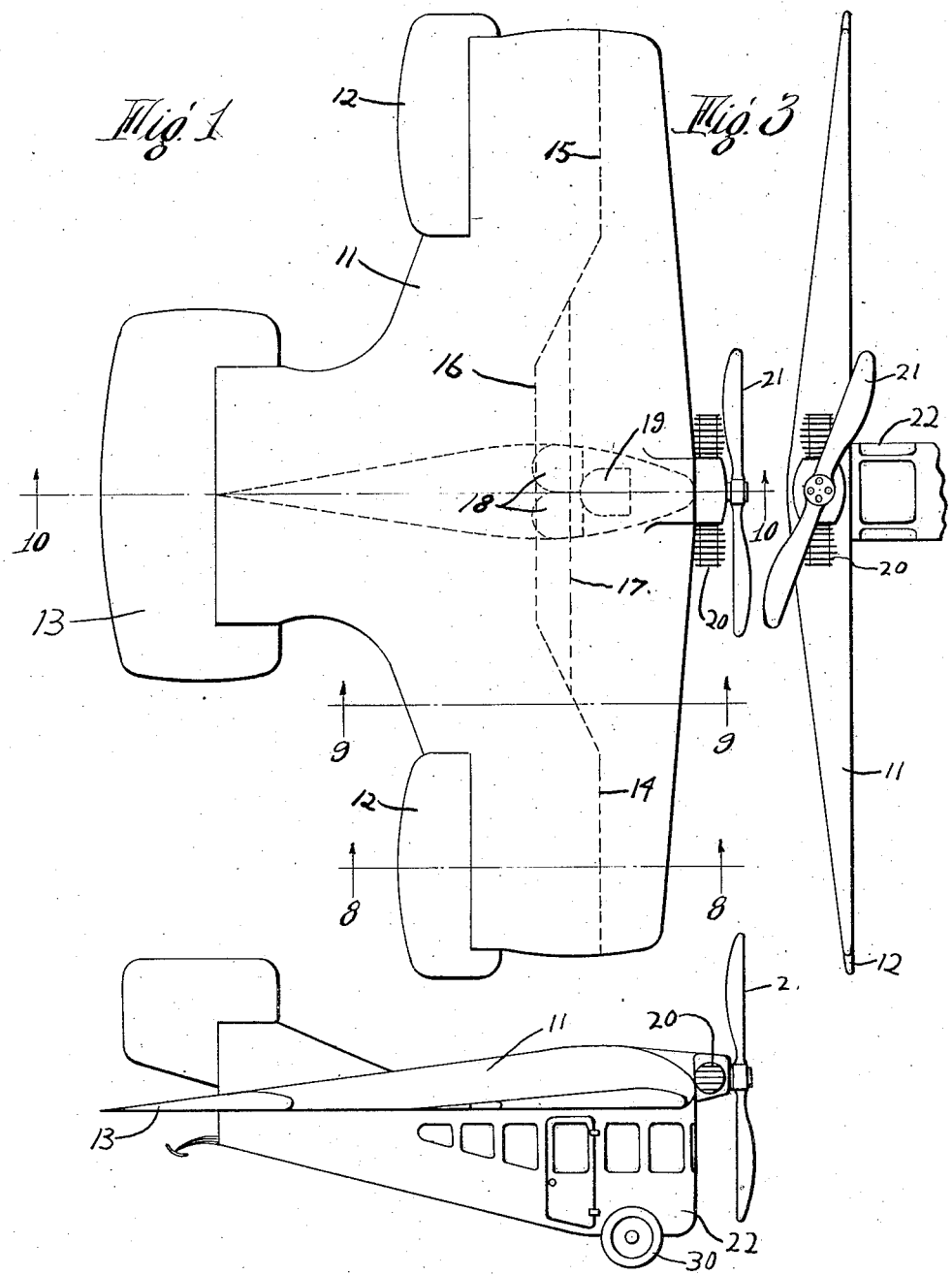

June 15, 1926.
H. M. ROCKWELL
AIRCRAFT
Filed Oct. 22, 1921
1,588,615
3 Sheets—Sheet 2
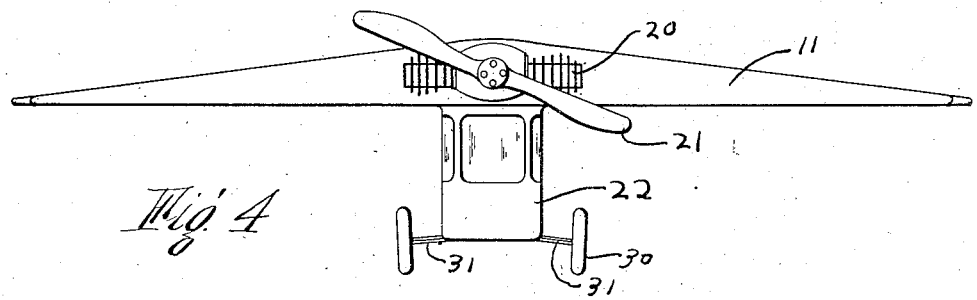
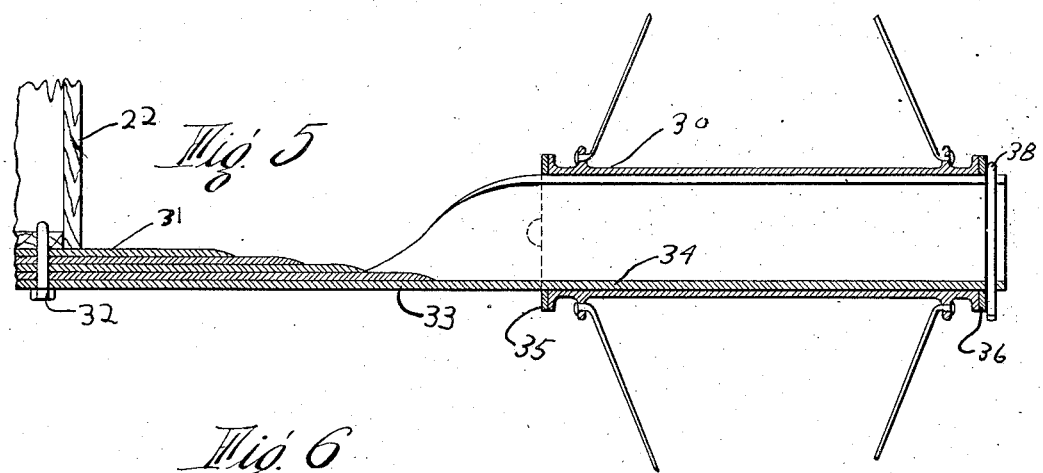
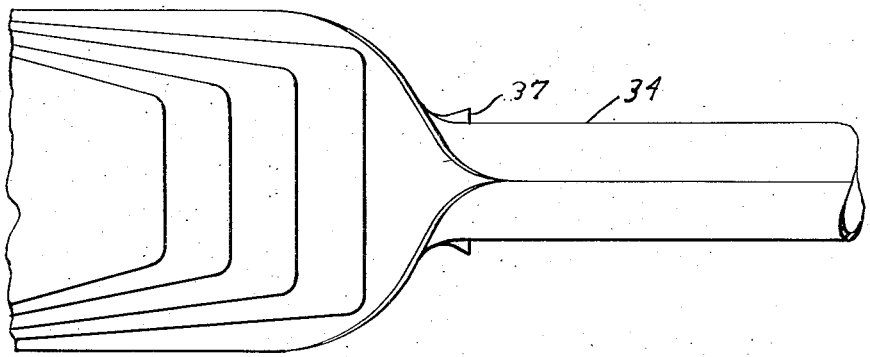
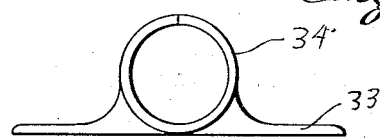
INVENTOR
Hugh M. Rockwell.
BY
Lewis O. Hutchinson
ATTORNEY June 15, 1926.

H. M. ROCKWELL 1,588,615

AIRCRAFT

Filed Oct. 22, 1921

3 Sheets-Sheet 3

INVENTOR
Hugh M. Rockwell.
BY
Lewis O. Hutchinson
ATTORNEY

UNITED STATES PATENT OFFICE.

HUGH M. ROCKWELL, OF BRISTOL, CONNECTICUT.

AIRCRAFT.

Application filed October 22, 1921. Serial No. 509,654.

This invention relates to aircraft and more especially to monoplanes.

It is an object of this invention to produce an aircraft of the monoplane type which is sturdy, strong and of simple and compact structure.

A further object of the invention is the provision of a monoplane in which the center of lift or buoyancy of the plane is further removed from the front edge of the supporting surface than heretofore.

A still further object of the invention is a reduction in the entering and trailing edge resistance of the supporting surface of the aircraft.

These objects are attained in a small monoplane by comprising the supporting member of a single integral wing the central portion of which is extended rearwardly to make the chord thereof only slightly less than the overall length of the craft and attaching the tail member or elevator to the rear edge of this portion. The center of lift or buoyancy of the supporting surface of an airplane is located on a line removed from the front edge of said surface a distance equal to approximately one third the chord thereof. It is the custom, in designing an airplane to locate all the variable weights such as fuel tanks, etc., either directly below or above this line. The constant weight such as the engine, propeller and pilot are so arranged relative to this line as to counterbalance the weight of that portion of the aircraft arranged rear of the center of the lift. In a small monoplane it has not been possible, because of the small depth of the supporting surface to locate the pilot in advance of this line. The pilot has been located either on this line or to the rear of it and it has, therefore, been necessary to place the engine and propeller at a considerable distance in advance of the front edge of the supporting surface in order to obtain the proper balance. By increasing the depth of the central portion of the supporting surface, the center of lift or buoyancy is moved rearwardly of the craft and allows the locating of the pilot in advance of the center of lift. Consequently, the engine and propeller can be placed but a short distance in advance of the front edge of the wing and still counterbalance the weight of the rear portion of the craft, thus increasing the compactness of the plane.

The entering and trailing edges of the supporting surface are reduced an amount equal to the width of the elevator and the entering and trailing edge resistance is reduced a corresponding amount. The supporting surface is substantially continuous from the entering edge to the extreme trailing edge and gives a more effective lifting power to the surface.

An additional object of the invention is the provision of means to diminish the shocks incident to the taking off or landing of the plane. This object is attained by supporting the wheels of the landing gear from the fuselage by means of resilient members.

Figure 9:
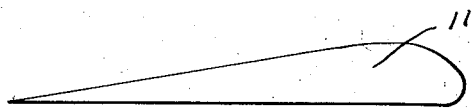
Figure 10:
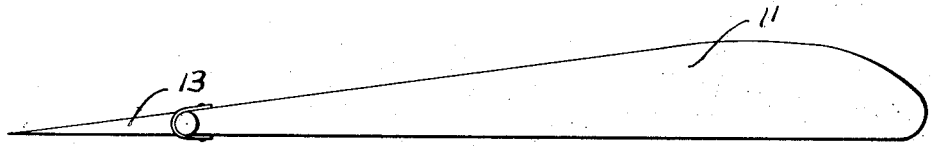

Other objects of the invention will become apparent from the following specification and accompanying drawing wherein Fig. 1 is a plan view of a monoplane constructed in accordance with the invention; Fig. 2 is a side elevation; Fig. 3 is a front elevation of the supporting member; Fig. 4 is a front elevation of the entire craft; Fig. 5 is an enlarged vertical section showing the shock absorbing connection between the wheels and the fuselage; Fig. 6 is a plan view of the connection; Fig. 7 is an end view thereof; Fig. 8 is a section on line 8—8 of Fig. 1; Fig. 9 is a section on line 9—9 of Fig. 1 and Fig. 10 is a section on line 10—10 of Fig. 1.

The supporting member of the aircraft comprises a single wing 11 which is preferably of the deep internally braced type of construction. The means for bracing the wing is not shown in the drawings as the particular arrangement of braces does not form a part of this invention. The side portions of the wing are of ordinary width and of comparatively slight depth. Toward its central portion the wing extends rearwardly a distance equal to several times the width of the side portions and terminates with a rear edge of approximately one fifth the width of the front edge. The depth of the wing increases toward the central portion thereof. The cross sections of various portions of the wing are clearly shown in Figs. 8, 9 and 10. Ailerons 12 are carried by the wing at the rear edges of the side portions and form continuations of said portions.

Pivotally attached to the rear edge of the wing is a tail member or elevator 13 which forms a continuation of the wing and is in effect integral therewith.

The dotted lines 14 and 15 indicate the center lines of buoyancy of the side portions of the wing 11, while the center line of buoyancy of the central portion of the wing is indicated by the line 16 which is somewhat to the rear of the major portions of the lines 14 and 15, due to the greater depth of the central section of the wing. The tapered contour of the rearwardly extending central portion bends the inner ends of the lines 14 and 15 rearwardly. The effective center of buoyancy, however, lies in the dotted line 17 which is located about midway between the line 16 and a line joining the outer portions of the lines 14 and 15. It is with reference to this line that the weight to be carried by the aircraft is located. The variable weight is located directly below and above this line. For example, the fuel and lubricant tanks (not shown) are supported on the upper surface of the wing directly above this line and the passenger seats 18 are located directly beneath it. The approximately constant weight is arranged in advance of this line. The pilot is seated at 19 and the engine 20 and tractor 21 are supported slightly in advance of the entering edge of the supporting member or wing 11. The weight of the pilot, the engine and the tractor screw is counterbalanced by that portion of the craft to the rear of the center of buoyancy. The additional weight due to the increased size of the wing is practically negligible and the more rearward location of the center of buoyancy allows the location of the fixed weight of the aircraft so that an extremely compact and serviceable arrangement is obtained. The fuselage 22 is supported from the wing in the usual manner and is preferably so located that its center of gravity is approximately in the same vertical plane as the center of buoyancy when the craft is flying horizontally. The arrangement of the fuselage is, however, mainly a matter of design and it may be of any suitable configuration and dimensions.

The elevator or tail 13, because of its attachment to the rear edge of the wing 11 forms with the wing a continuous supporting surface from the entering edge of the wing to the rear edge of the tail. A substantial portion of the trailing edge of the wing is thus eliminated as well as the entire entering edge of the elevator. In aircraft, the matter of the entering edge and trailing edge resistance of the elevating surface and of the steering surfaces is of considerable importance. The arrangement of the elevator as a continuation of the wing eliminates from consideration the entering edge resistance of the elevator and also the trailing edge resistance of a portion of the wing equal to the width of the elevator. The continuous lifting surface from the entering edge of the wing to the extreme trailing edge of the elevator produces an extremely compact, sturdy and efficient aircraft.

The operating means for controlling the elevator and ailerons have been omitted from the drawing inasmuch, as the particular design and arrangement of these elements form no part of this invention.

In order to minimize the shocks and jolts incident to landing, the wheels 30 are resiliently attached to the fuselage 22. A set of leaf springs 31 is connected to each side of the bottom of the fuselage by means of bolts 32. The lower leaf 33 of the set 31 extends a considerable distance beyond the end of the adjacent leaf and the outer portion thereof is rolled to form a hub or axle 34. The wheel 20 is located on the axle 24 and is maintained in position by the collars 35 and 36. The collar 35 rests against projections 37 stamped out of the spring 33. A cotter pin 38 or other suitable fastening means holds the collar 36 against the wheel. The leaf adjacent to the leaf 33 may extend slightly into the cylindrical portion 34 and its end may be shaped to conform to the curved portion of 33 adjacent the hub. Furthermore, a set of springs may be provided for each wheel or a single set of springs may be used to support both wheels. In the latter case the springs would be of sufficient length to extend across the fuselage and project enough to locate the wheels laterally of the fuselage.

It is obvious that various modifications may be made in the structure of the device above described without departing in any way, from the spirit of the invention as set forth in the appended claims.

I claim—

1. In a monoplane, a wing including a central portion and side portions, said side portions having ailerons at their rear edges forming continuations of the side portions, the central portion extending rearwardly beyond the side portions and having converging side edges forming continuations of the rear edges of the side portions, an elevator forming a continuation of the central portion and arranged at the rear edge of the latter, a fuselage of substantially the same length as the central portion arranged directly beneath the latter, an engine and traction propeller arranged forwardly of the wing but in close proximity thereto, and a pilot seat arranged forwardly of the line of buoyancy of the craft.

2. In a monoplane, a substantially T-shaped wing with its stem extending rearwardly, the stem of the T forming the central portion of the wing and the arms of the T forming the sides of the wing, said arms gradually decreasing in thickness from the central portion toward the outer edges of the arms, ailerons arranged at the rear edges of said arms and forming continuations of the latter, an elevator arranged at the rear end of the central portion and forming a continuation of the latter, the side edges of the central portion converging rearwardly and forming continuations of the rear edges of the arms, a fuselage of substantially the same length as the central portion arranged directly beneath the latter, an engine and a traction propeller arranged forwardly of the front edge of the wing but in close proximity to the latter, and a pilot seat arranged forwardly of the line of buoyancy of the craft.

In witness whereof, I hereunto subscribe my name this 30th day of September, 1921.

HUGH M. ROCKWELL.